US012629592B2

(12) United States Patent (10) Patent No.: US 12,629,592 B2
Nelson (45) Date of Patent: May 19, 2026

(54) WIN CELEBRATION RECORDING AND RANKING

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 210 days.

(21) Appl. No.: 18/131,976

(22) Filed: Apr. 7, 2023

(65) Prior Publication Data

US 2024/0335744 A1 Oct. 10, 2024

(51) Int. Cl.
*G07F 17/32* (2006.01)
*A63F 13/52* (2014.01)
*A63F 13/69* (2014.01)
*A63F 13/86* (2014.01)

(52) U.S. Cl.
CPC ............. *A63F 13/52* (2014.09); *A63F 13/69* (2014.09); *G07F 17/3234* (2013.01); *G07F 17/3239* (2013.01); *A63F 13/86* (2014.09)

(58) Field of Classification Search
None
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 2005/0064926 A1* | 3/2005 | Walker ..................... | H04N 7/18 463/16 |
| 2009/0093300 A1* | 4/2009 | Lutnick ............... | G07F 17/3293 463/31 |
| 2009/0118022 A1* | 5/2009 | Lyons ................... | G06Q 30/02 463/42 |
| 2017/0266552 A1* | 9/2017 | Paradise ................ | A63F 13/48 |
| 2021/0110666 A1* | 4/2021 | Thomas ............... | H04W 4/021 |

* cited by examiner

*Primary Examiner* — Damon J Pierce
(74) *Attorney, Agent, or Firm* — Sheridan Ross P.C.

(57) ABSTRACT

Embodiments of the present disclosure are directed to capturing and ranking videos of players reacting to events in the electronic game and using those videos to attract other players. As will be described, embodiments allow players to record celebration videos, i.e., videos of the player reacting to a win, when the hit a jackpot, have a winning hand or set of numbers, bet on a winning horse or team, etc. The videos can then be used to attract other players to a game. In some cases, an incentive can be provided to encourage players to provide celebration videos. For example, having the highest ranked video can provide benefits to players such as player loyalty points or prizes. The videos can be ranked and organized by denomination, wager, theme, Electronic Gaming Machine (EGM) or bank of EGMs played, etc. and prizes can be awarded accordingly.

10 Claims, 5 Drawing Sheets

405

Conduct electronic game

410

Detect occurrence of event

415

Receive video stream

420

Store received video stream

425

Rank stored video streams

430

Present video stream

Receive video
stream(s) — 505

Store received
video stream(s) — 510

Rank stored video
streams — 515

Present video
stream(s) — 520

Update player
record(s) — 525

WIN CELEBRATION RECORDING AND RANKING

BACKGROUND

The present disclosure is generally directed to attracting players to and increasing player involvement in an electronic game and, more particularly, to capturing and ranking videos of players reacting to events in the electronic game and using those videos to attract other players.

Operators of gaming systems such as Electronic Gaming Systems (EGMs), Video Lottery Terminals (VLTs), sports betting terminals, and gaming venues in which they are installed benefit in terms of increased revenue when player engagement is increased. Player engagement can be increased by building excitement. Hence there is a need in the art for increasing engagement of players by building excitement.

BRIEF SUMMARY

Embodiments of the present disclosure are directed to methods and systems for attracting players to and increasing player involvement in an electronic game. According to one embodiment, a gaming system can comprise a display device, a processor coupled with the display device, and a memory coupled with and readable by the processor. The memory can store therein a set of instructions which, when executed by the processor, causes the processor to conduct an electronic game with a player and detect an occurrence of a predefined gaming event in the electronic game. In response to detecting the occurrence of the predefined event in the electronic game, the instructions can cause the processor to receive a video stream depicting a player of the electronic game, store the received video stream and present the stored video stream through the display device at a time after completion of the electronic game with the player.

For example, the gaming system can further comprise a video camera. In such cases, receiving the video stream can comprise receiving the video stream from the video camera of the gaming system. In another example, the gaming system can additionally, or alternatively, comprise a wireless communications interface. In such cases, receiving the video stream comprises receiving the video stream from a mobile device of the player of the electronic game through the wireless communications interface. The video stream can be received at a time after the completion of the electronic game.

Presenting the stored video stream at a time after completion of the electronic game with the player can comprise presenting the video stream through the display device during an idle period for the gaming system. In some cases, the electronic game can be one of a plurality of electronic games available on the gaming system. In such cases, presenting the stored video stream at a time after completion of the electronic game with the player can comprise presenting the video stream through the display device during a game selection process. Additionally, or alternatively, presenting the stored video stream at a time after completion of the electronic game with the player comprises presenting the video stream through the display device during a subsequent electronic game with a different player.

According to another embodiment, a gaming venue host system can comprise a processor and a memory coupled with and readable by the processor. The memory can store therein a set of instructions which, when executed by the processor, causes the processor to receive a plurality of video streams. Each video stream of the plurality of video streams can depict a player of an electronic game performing an action after occurrence of an event in the electronic game. The instructions can further cause the processor to store each video stream the received plurality of video streams, rank the stored plurality of video streams, and present at least one of the stored video streams based on the ranking of the stored video streams.

Ranking the stored plurality of video streams can be based on feedback from viewers of the stored plurality of video streams. Additionally, or alternatively, ranking the stored plurality of video streams can performed automatically by the gaming venue host system. For example, ranking the stored plurality of video streams can be based on recency of each video stream of the plurality of video streams. In another example, ranking the stored plurality of video streams is based on a win amount for the event. In another example, ranking the stored plurality of video streams can be based on a number of players playing an electronic game associated with the video stream after the video stream is presented. Additionally, or alternatively, ranking the stored plurality of videos can be based on game play information for an electronic game associated with the video.

According to yet another embodiment, a method for utilizing video depictions of players of electronic games can comprise receiving a plurality of video streams. Each video stream of the plurality of video streams can depict a player of an electronic game performing an action after occurrence of an event in the electronic game. The received plurality of video streams can be stored, ranked, and presented based on the ranking of the stored video streams.

An electronic record associated with the player depicted in at least one of the presented video streams can be updated to indicate an award to the player based on the ranking of the stored plurality of video streams. For example, the award to the player depicted in the at least one of the presented video streams can comprise any one or more of a credit of a monetary award, a credit of loyalty points, a membership status, services of a gaming venue, access to one or more restricted features of an electronic game, etc.

Additional features and advantages are described herein and will be apparent from the following Description and the figures.

DETAILED DESCRIPTION

Embodiments of the present disclosure are directed to capturing and ranking videos of players reacting to events in the electronic game and using those videos to attract other players. As will be described, embodiments allow players to record celebration videos, i.e., videos of the player reacting to a win, when the hit a jackpot, have a winning hand or set of numbers, bet on a winning horse or team, etc. In some cases, the players can be recorded reacting to a negative event, e.g., a loss by themselves or another player. The videos can then be used to attract other players to a game. In some cases, an incentive can be provided to encourage players to provide celebration videos. For example, having the highest ranked video can provide benefits to players such as player loyalty points or prizes. The videos can be ranked and organized by denomination, wager, theme, Electronic Gaming Machine (EGM) or bank of EGMs played, etc. and prizes can be awarded accordingly. Accordingly, embodiments of the present disclosure are thought to increase engagement for players participating in an electronic game as well as to attract other players to participate. This increased excitement and engagement, leading to greater participation can increase gaming system utilization in a casino or other gaming venue thereby increasing revenue for the operator of the casino in which the gaming system is installed.

Figure 1:
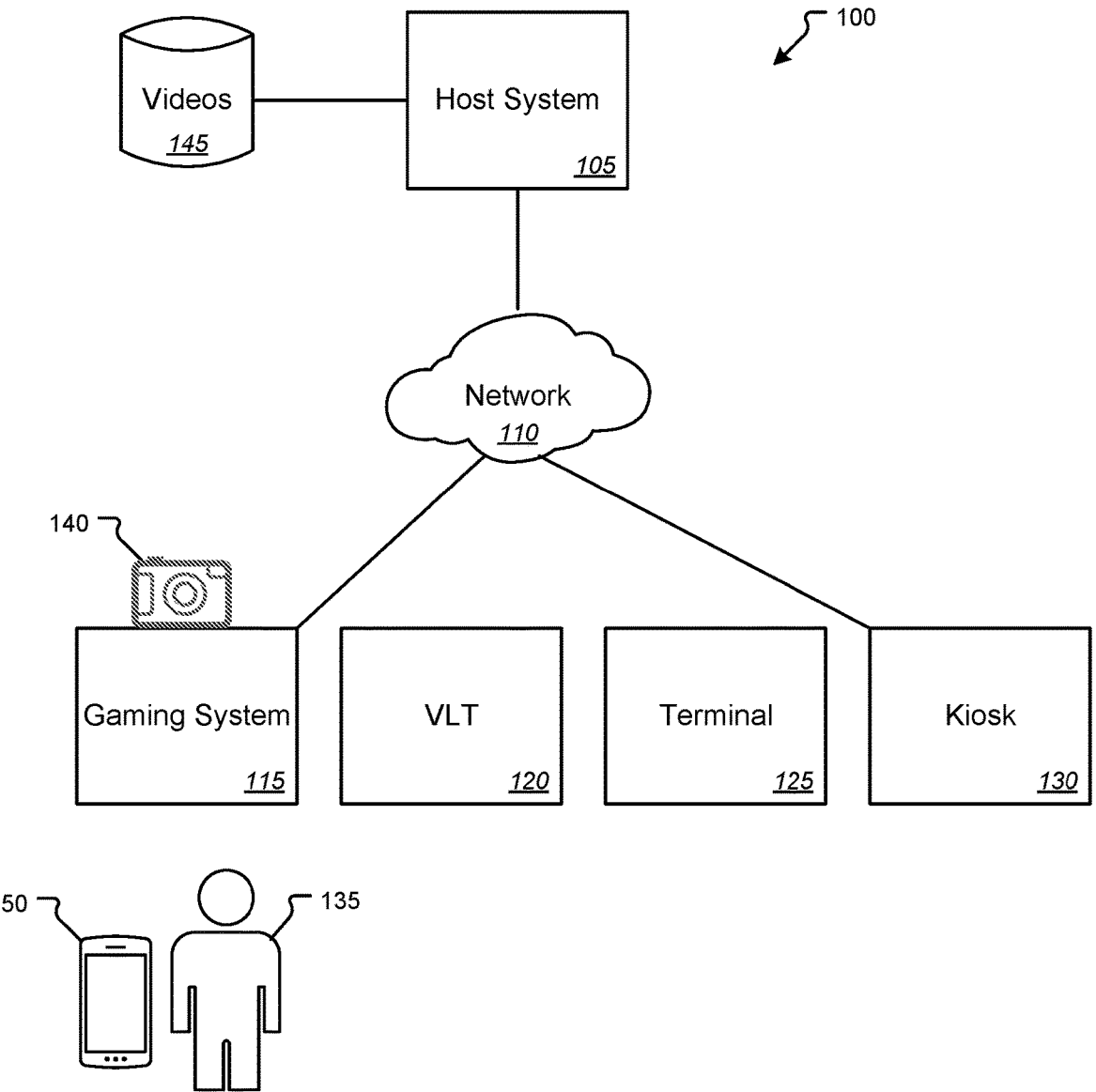
FIG. 1 is a block diagram illustrating elements of an exemplary environment for capturing and ranking videos of players reacting to events in the electronic game and using those videos to attract other players according to one embodiment of the present disclosure.

FIG. 1 is a block diagram illustrating elements of an exemplary environment for capturing and ranking videos of players reacting to events in the electronic game and using those videos to attract other players according to one embodiment of the present disclosure. As illustrated in this example, the environment 100 can include a host system 105 of a gaming venue. The host system 105 can comprise any one or more servers and/or other computer systems installed at the gaming venue location or elsewhere. The host system 105 can be communicatively coupled with a network 110 comprising any one or more wired and/or wireless, local area and/or wide area networks as known in the art.

Any number of gaming systems 115, Video Lottery Terminals (VLTs) 120, sports betting terminals 125, kiosks 130, etc. as commonly found in a casino or other gaming venue can also be coupled with the network 110. Through these various systems 115, 120, 125, and 130, a player 135 can participate in various gaming activities. According to one embodiment, the gaming systems 115 can include a camera 140. While not shown here for the sake of simplicity, any or all of the VLTs 120, sports betting terminals 125, and/or kiosks 130 can also include a camera. In any of these systems, the camera can be installed on, in, or near the system. For example, the camera 140 of the gaming system 115 may be mounted on an exterior cabinet of the gaming system 115. In other cases, the camera 140 may be installed within the cabinet of the gaming system 115, e.g., behind a transmissive display of the gaming system 115.

Regardless of exactly how or where the camera 140 is installed, it can be used to capture a video stream of the player 135. Generally speaking, embodiments of the present disclosure are directed to capturing a video stream of the player 135, e.g., using such a camera 140. These video streams may be maintained by the gaming system 115, or other systems 120, 125, and 130, or may be transferred to the host system 105 via the network 110 to be maintained by the host system 105 in a repository 145.

The ability to capture the video can be triggered by a winning event such as a certain win category such as a royal flush, a certain win amount such as wins over $1000, a win amount that exceeds a previous limit or places the win onto a leaderboard, etc. In some embodiments the trigger can also be based on player loyal account status, player play amount of money or time, how "new" the game is, some system event such as a lucky coin bonus, etc. The triggering of the recording event can allow the player 135 to record a celebration video that shows the player 135 reacting to the win in some unique manner. In one embodiment, the player 135 can record immediately or soon after the event while in other embodiments the player 135 could record at a later time. The trigger of the recording might allow the player to record a certain amount of time, such as a video that is 5 seconds. In one embodiment the gaming system 115 or host system 135 can scale the amount of time by the magnitude of the trigger. For example, a win of $1000 might allow recording a 5 second video while a win of $5000 might allow recording a 10 second video. According to one embodiment, the gaming system 115, host system 105, or other system 120, 125, 130 can trim the videos according to such triggering parameters. For example, Sarah triggers the video capturing with a $1000 win. The gaming system 115, host system 105, or other system 120, 125, 130 can prompt her that she may upload a 5 second video. Sarah uploads an 8 second video so the gaming system 115, host system 105, or other system 120, 125, 130 crops it to 5 seconds. The gaming system 115, host system 105, or other system 120, 125, 130 may also convert the recording by scaling the content, adjust color, cropping etc.

In one embodiment the gaming system 115, host system 105, or other system 120, 125, 130 can allow the player 135 to review the video and approve it. If the player 135 does not approve it the gaming system 115, host system 105, or other system 120, 125, 130 can allow the player to record another video.

In one embodiment, the gaming system 115, host system 105, or other system 120, 125, 130 can show the player 135 their celebration video next to one or more other celebration videos so the player 135 can compare. For example, Sarah records her video. The gaming system 115, host system 105, or other system 120, 125, 130 can show Sarah the previously highest-ranking video of Tom celebrating. Sarah realizes that her video was not exciting enough and decides to record a more exciting celebration video.

According to one embodiment, the player can use a mobile device 150 to record the video and then transfer that video via wireless connection to the gaming system 115, host system 105, or other system 120, 125, 130. Allowing the player 135 to use a mobile device 150 to record the video allows players to retrieve props, visit a certain location in the casino, gather friends, etc.

When the video is stored, the gaming system 115, host system 105, or other system 120, 125, 130 can record the time and date of the event, the win amount, the wager amount, denomination, game configuration, the theme played, the EGM or gaming system 115 played and the player loyalty account number, if available. The gaming system 115, host system 105, or other system 120, 125, 130 can use this information later. Players might opt in or out of having their name or certain information recorded or shown to other players.

According to one embodiment, the gaming system 115, host system 105, or other system 120, 125, 130 can use the stored celebration videos to capture the attention of players walking by the EGM or gaming system 115 when it is not in use. For example, the celebration videos can be shown on overhead signs such as a sign above a bank of EGMs.

In some cases, software on the gaming system 115 can display list of games available on the gaming system 115 to the player 135 and allow the player 135 to choose which game to play. In one embodiment, the celebration videos can be shown alongside, or associated with, each game or theme for which the video was recorded. In some cases, the gaming system 115 can show a player the celebration video when the game is chosen in order to provide excitement. For example, Sarah records her video of her $1000 win on the Hot Tamales game. She leaves. When Bob sits down at the gaming system 115, he chooses the Hot Tamales game and is shown Sarah's celebration video as an introduction to the game.

As previously mentioned, the gaming system 115, host system 105, or other system 120, 125, 130 can store information with each video, such as wager amount and other information. Such information can be used for ranking the stored videos. For example, the gaming system 115, host system 105, or other system 120, 125, 130 could show the highest ranked celebration video the currently selected denomination.

In one embodiment the gaming system 115 can display one of the top ranked celebration videos when the game hits a win. For example, Thomas sits down to play the game and wins 4 cherries so the gaming system 115 can show Thomas the second ranked celebration video. Thomas later hits 5 cherries so the gaming system 115 can show Thomas the highest ranked celebration video.

In some embodiments the celebration video can be shown as an overlay while in other embodiments it can be incorporated into game content such as the celebration video replacing winning symbols on slot reels. In one embodiment the display of the video can include the time and date, win amount, wager amount, denomination, player name, etc. as an overlay or in association with the video. In some embodiments the overlay can show the rank of the video, number of likes, time spent being ranked, etc.

In one embodiment the display of the video can be provided on a "near miss." A near miss if when the player almost hits a win. For example, the top prize is 5 cherries and award $10,000. Bob get 4 cherries and does not hit the award, but the EGM shows Bob the win celebration of somebody winning the top prize.

In one embodiment the gaming system 115, host system 105, or other system 120, 125, 130 can show the video in the "See Pays" functionality. This is the functionality of the game that allows the player 135 to review the pay schedule of the game. The pay schedule shows the player 135 which outcomes award which prizes. In this embodiment the gaming system 115, host system 105, or other system 120, 125, 130 can allow the player to view the celebration(s) associated with each wins in the pay table.

In one embodiment, the gaming system 115, host system 105, or other system 120, 125, 130 can keep the latest celebration for each theme or for each gaming system 115. In this manner, new videos can replace previous ones. In another embodiment, the gaming system 115, host system 105, or other system 120, 125, 130 can keep more than one video per theme or per gaming system 115, such as the highest ranking 3 videos for each theme.

In one embodiment, the gaming system 115, host system 105, or other system 120, 125, 130 can automatically rank the videos, while in another embodiment the players rank the videos. Automatic ranking can happen by choosing the most recent or largest wins at the highest rank. The gaming system 115, host system 105, or other system 120, 125, 130 could randomly change out videos. In player ranking, players could "Like" videos while they are being shown. All players could vote or only certain players or certain conditions may allow voting. For example, only player loyalty account players might be allowed to like videos or players could win the ability to vote through a game win, game feature, amount wagered or time playing the machine or theme. In a combination player and automatic ranking, the gaming system 115, host system 105, or other system 120, 125, 130 could determine that a video has a high rank because when it is shown more people seem to play the gaming system 115.

In some embodiment the ranking system can be on a per gaming system basis while in others it could be per bank, per section, per casino, per market etc. For example, the top celebration video could be the top video for the entire casino and not just for one EGM.

As previously mentioned, the gaming system 115, host system 105, or other system 120, 125, 130 can store information with each video, such as wager and can be used for ranking also. The gaming system 115, host system 105, or other system 120, 125, 130 could have the highest ranked video for $1 play and another highest ranked video for $5 play.

In one embodiment, players with high-ranking videos can receive some incentive or compensation including money, prizes, casino services, discounts, game feature unlocks, achievements, player loyalty points, etc. For example, the person with the highest-ranking video might receive a percentage of some or all wagers at the gaming system 115. The money could be automatically credited to the wagering account of the person who recorded the video. In another example, the person recording the video might receive a free meal if the video receives 1000 likes or is the top video for longer than 1 week. Additionally, or alternatively, the person recording the video might receive player loyalty points proportional to some or all of the play of the gaming system 115 or theme. For example, Sarah has the top rank video on the EGM and she receives 1 player loyalty point for every $25 wagered at the EGM while her video is ranked number 1. In one embodiment, certain features of a game can be unlocked for players with high-ranking videos. Additionally, or alternatively, players with high-ranking videos can receive special status or achievements. In some cases, players with high-ranking videos can be indicated by special graphics, animations or sounds when they are at a gaming system 115 to attract attention to them. In some embodiments, the benefits can be given to the person who recorded the celebration video based on, or partially based on, the number of times the video was shown to other players. Additionally, or alternatively, videos ranked second or third can receive some benefits, perhaps to a lesser extent or of a lesser value that the top rated videos. In one embodiment, one or more high ranking videos can be uploaded to social media sites such as Facebook or YouTube. The upload might be an advertisement for the new game theme. In such cases, the gaming system 115, host system 105, or other system 120, 125, 130 can upload the top group of people reacting to the win at the gaming system 115 along with the name, and logo of the new theme.

Figure 2:
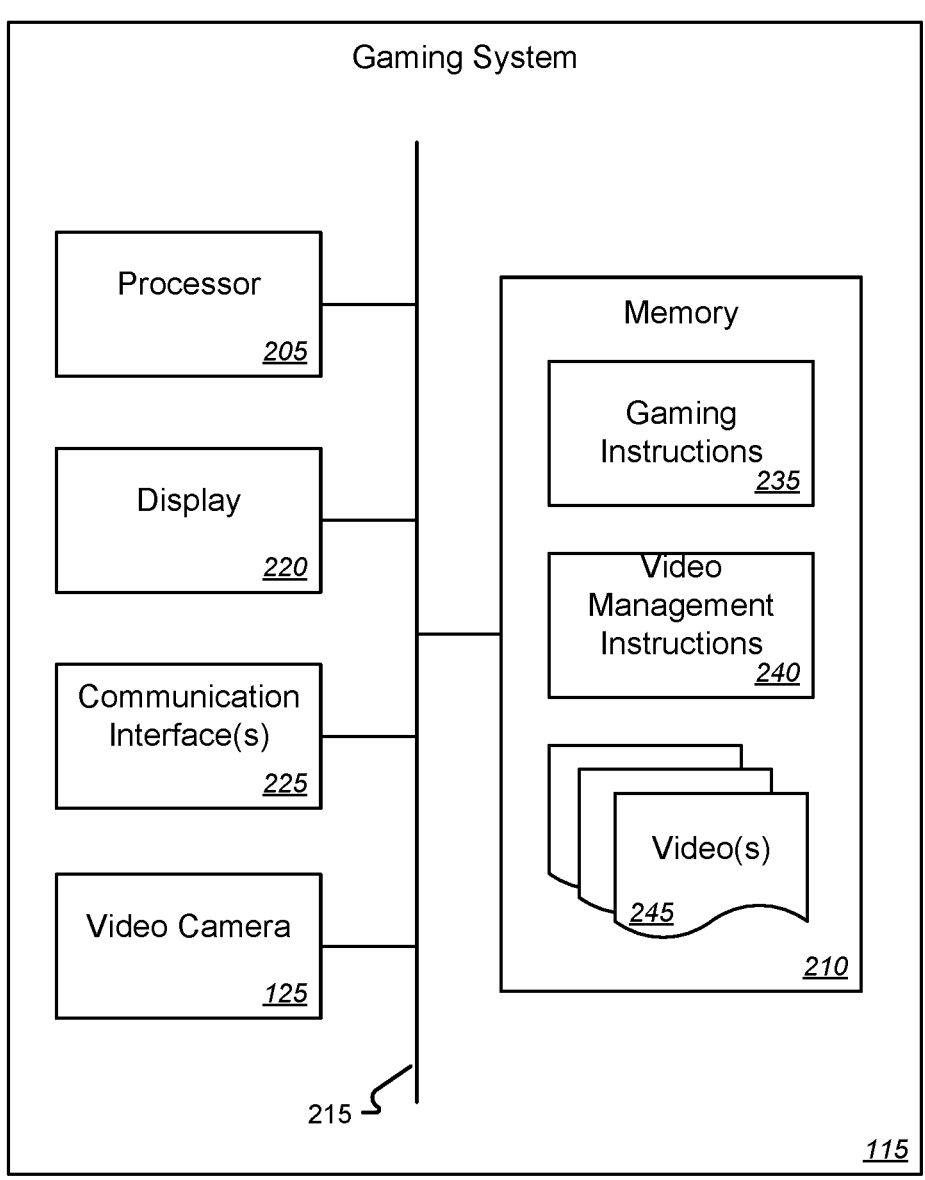
FIG. 2 is a block diagram illustrating additional details of components of an exemplary gaming system according to one embodiment of the present disclosure.

FIG. 2 is a block diagram illustrating additional details of components of an exemplary gaming system according to one embodiment of the present disclosure. As illustrated in this example, the gaming system 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the gaming system 105 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with a display device 220 and one or more communications interfaces 225. The display device 220 can comprise, for example, a Liquid Crystal Display (LCD), Light Emitting Diode (LED), Organic Light Emitting Diode (OLED), or other type of display. The communication interfaces 225 can comprise, for example, Ethernet, Bluetooth, WiFi, or other type of wired or wireless communications interfaces.

The memory 410 can store therein a set of gaming instructions 235 which, when executed by the processor 205, causes the processor 205 to conduct an electronic game with a player 120. The electronic game can be any of a variety of well-known casino games including, but not limited to video slots, video poker, a video table game, etc. The gaming instructions 235 can further cause the processor 205 to detect an occurrence of a predefined gaming event in the electronic game. For example, the predefined event can comprise an event such as a winning combination, hand, selection, etc.

The memory 210 can also have stored therein a set of video management instructions 240. When executed by the processor 205, the video management instructions 240 can cause the processor 205 to, in response to detecting the occurrence of the predefined event in the electronic game, receive a video stream depicting a player 120 of the electronic game and store the received video. The stored video(s) 245 can be maintained in the memory 210 of the gaming system 105, storage (not shown here) attached to the gaming system 105, or one another system such as a host system 105 of the gaming venue in which the gaming system 105 is installed and communicatively coupled with the gaming system 105 via communication interfaces 225. In some cases, the gaming system 105 can further comprise a video camera 125. In such cases, receiving the video stream can comprise receiving the video stream from the video camera 125 of the gaming system 105. In another example, the communication interfaces 225 of the gaming system 105 can additionally, or alternatively, comprise a wireless communications interface. In such cases, receiving the video stream can comprise receiving the video stream from a mobile device 135 of the player 120 of the electronic game through the communication interfaces 225. The video stream can be received while the electronic game is still being conducted or at a time after the completion of the electronic game. For example, the player 120 may be given a chance to record a reaction at a place other than in front of the gaming system 105.

The video management instructions 240 can further cause the processor 205 to rank the stored video streams 245. Ranking the stored plurality of video streams can be based on feedback from viewers of the stored plurality of video streams, e.g., by "likes," votes, based on sharing of the videos, etc. Additionally, or alternatively, ranking the stored plurality of video streams can performed automatically. For example, ranking the stored plurality of video streams can be based on recency of each video stream of the plurality of video streams. In another example, ranking the stored plurality of video streams can be based on a win amount for the event. In another example, ranking the stored plurality of video streams can be based on a number of players playing an electronic game associated with the video stream after the video stream is presented and used to promote that electronic game. Additionally, or alternatively, ranking the stored plurality of videos can be based on game play information for an electronic game associated with the video, e.g., length of time played, amounts wagered, etc.

The video management instructions 240 can further cause the processor 205 to present the ranked videos after completion of the electronic game. For example, one or more of the videos 245 may be used to promote the electronic game for which it was recorded. Presenting the stored video stream 245 at a time after completion of the electronic game with the player 120 can comprise presenting the video stream 245 through the display device 220 of the gaming system 105 during an idle period for the gaming system 105. In some cases, the electronic game can be one of a plurality of electronic games available on the gaming system 105. In such cases, presenting the stored video stream 245 at a time after completion of the electronic game with the player 120 can comprise presenting the video stream 245 through the display device 220 during a game selection process. Additionally, or alternatively, presenting the stored video stream 245 at a time after completion of the electronic game with the player 120 comprises presenting the video stream 245 through the display device 220 during a subsequent electronic game with a different player, e.g., in reaction to an event occurring in the electronic game with that player.

Figure 3:
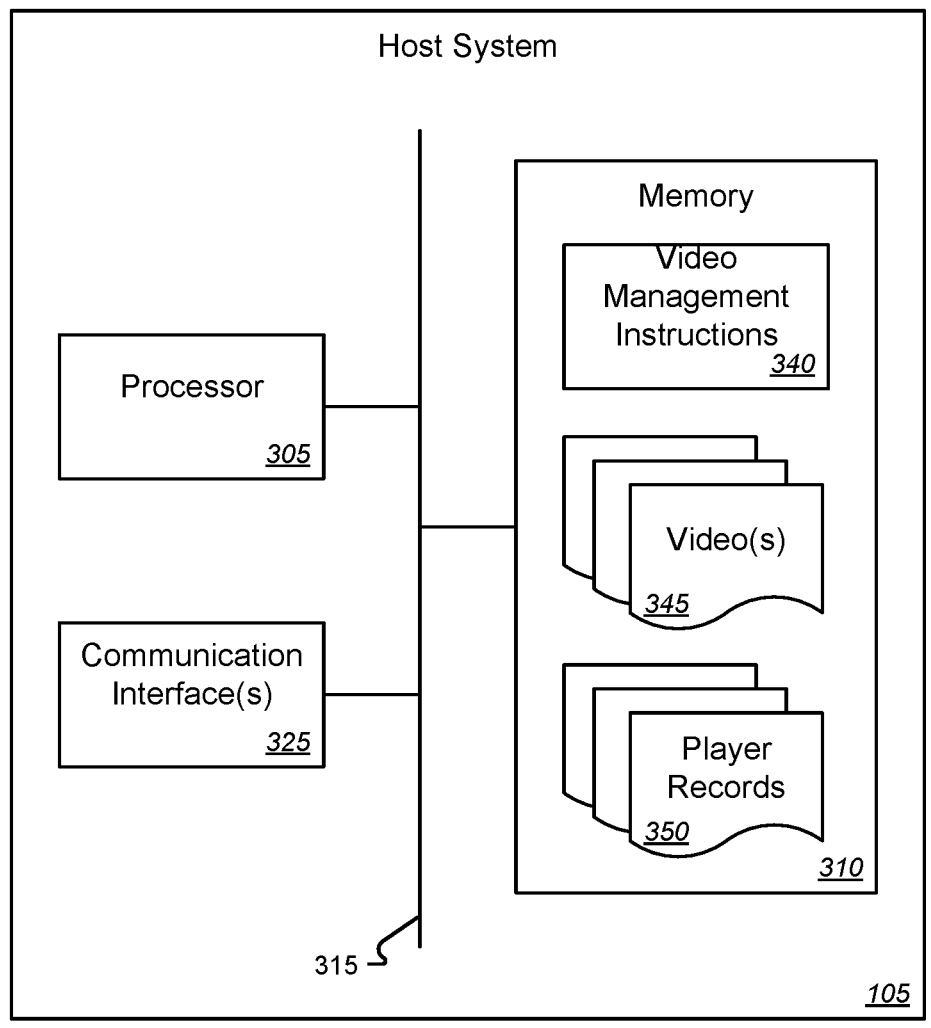
FIG. 3 is a block diagram illustrating additional details of components of an exemplary host system according to one embodiment of the present disclosure.

FIG. 3 is a block diagram illustrating additional details of components of an exemplary host system 105 according to one embodiment of the present disclosure. As illustrated in this example, the host system 105 can comprise a processor 305 such as any of the various types of processors described above. A memory 310 can be coupled with and readable by the processor 305 via a communications bus 315. The memory 310 can comprise any one or more of the different types of volatile and/or non-volatile memories described above. The processor 305 can also be coupled with one or more communication interfaces 325 via the communications bus 315. The communication interfaces 325 can comprise, for example, Ethernet, Bluetooth, WiFi, or other type of wired or wireless communications interfaces.

The memory 310 can store therein a set of video management instructions 340 which, when executed by the processor 305, causes the processor 305 to receive a plurality of video streams, e.g., through the communication interfaces 325, from a gaming system 105, kiosk 140, mobile device 135 of a player 120, etc. Each video stream of the plurality of video streams can depict a player 120 of an electronic game performing an action after occurrence of an event in the electronic game.

The video management instructions 340 can further cause the processor to store the received video streams 345, e.g., within the memory 310 of the host system 105, in attached storage (not shown here) or in storage of another system, and rank the stored video streams. Ranking the stored plurality of video streams 345 can be based on feedback from viewers of the stored plurality of video streams 345. Additionally, or alternatively, ranking the stored plurality of video streams 345 can performed automatically by the gaming venue host system 105. For example, ranking the stored plurality of video streams 345 can be based on recency of each video stream of the plurality of video streams 345. In another example, ranking the stored plurality of video streams 345 can be based on a win amount for the event. In another example, ranking the stored plurality of video streams 345 can be based on a number of players playing an electronic game associated with the video stream after the video stream is presented. Additionally, or alternatively, ranking the stored plurality of videos 345 can be based on game play information for an electronic game associated with the video.

The video management instructions 340 can further cause the processor to present one or more of the stored and ranked video streams 345 nted, e.g., by streaming, through the communication interfaces 325, to a gaming system 105, kiosk 140, display device, or other system to be displayed thereon. Presenting the stored video stream a can comprise presenting the video stream through a display device of a gaming system 105 during an idle period for the gaming system 105. In some cases, the electronic game can be one of a plurality of electronic games available on the gaming system 105. In such cases, presenting the stored video stream at a time after completion of the electronic game with the player 120 can comprise presenting the video stream through the display device of the gaming system 105 during a game selection process. Additionally, or alternatively, presenting the stored video stream at a time after completion of the electronic game with the player 120 can comprise presenting the video stream through the display device of the gaming system 105 during a subsequent electronic game with a different player.

The memory 310 can also have stored therein a set of player records 350. The player records 350 can relate to and define a player account, loyalty account, etc. The video management instructions 340 can further cause the processor 305 to update an electronic record 350 associated with the player 120 depicted in at least one of the presented video streams to indicate an award to the player 120 based on the ranking of the stored plurality of video streams 345. For example, the award to the player 120 depicted in the at least one of the presented video streams 345 can comprise any one or more of a credit of a monetary award, a credit of loyalty points, a membership status, services of a gaming venue, access to one or more restricted features of an electronic game, etc.

Figure 4:
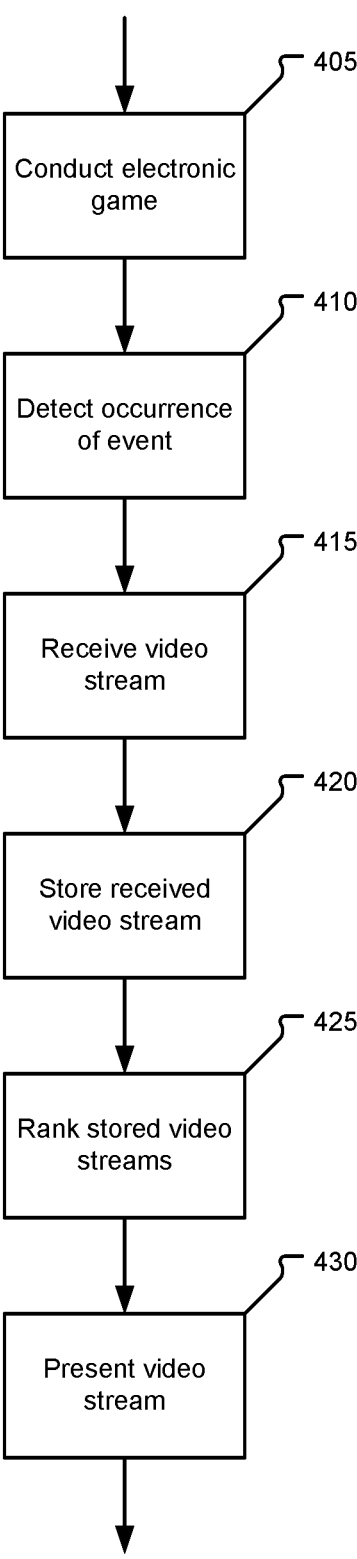
FIG. 4 is a flow diagram illustrating an exemplary process for capturing and ranking videos of players reacting to events in the electronic game and using those videos to attract other players according to one embodiment of the present disclosure.

FIG. 4 is a flow diagram illustrating an exemplary process for capturing and ranking videos of players reacting to events in the electronic game and using those videos to attract other players according to one embodiment of the present disclosure. More specifically, this example illustrates an embodiment as may be performed on a gaming system 105 as described above. As illustrated in this example, the process can begin with conducting 405 an electronic game with a player 120. The electronic game can be any of a variety of well-known casino games including, but not limited to video slots, video poker, a video table game, etc. An occurrence of a predefined gaming event can be detected 410 in the electronic game. For example, the predefined event can comprise an event such as a winning combination, hand, selection, etc.

In response to detecting 410 the occurrence of the predefined event in the electronic game, a video stream depicting a player 120 of the electronic game can be received 415 and stored 420. For example, the gaming system 105 can further comprise a video camera 125. In such cases, receiving 415 the video stream can comprise receiving the video stream from the video camera 125 of the gaming system 105. In another example, the gaming system 105 can additionally, or alternatively, comprise a wireless communications interface 225. In such cases, receiving 415 the video stream can comprise receiving the video stream from a mobile device 135 of the player 120 of the electronic game through the wireless communications interface 225. The video stream can be received 415 while the electronic game is still being conducted or at a time after the completion of the electronic game. For example, the player 120 may be given a chance to record a reaction at a place other than in front of the gaming system 105.

The stored videos 245 can then be ranked 425. Ranking 425 the stored plurality of video streams 245 can be based on feedback from viewers of the stored plurality of video streams 245, e.g., by "likes," votes, based on sharing of the videos, etc. Additionally, or alternatively, ranking 425 the stored plurality of video streams 245 can performed automatically. For example, ranking 425 the stored plurality of video streams 245 can be based on recency of each video stream of the plurality of video streams 245. In another example, ranking 425 the stored plurality of video streams 245 can be based on a win amount for the event. In another example, ranking 425 the stored plurality of video streams 245 can be based on a number of players playing an electronic game associated with the video stream after the video stream is presented and used to promote that electronic game. Additionally, or alternatively, ranking 425 the stored plurality of videos 245 can be based on game play information for an electronic game associated with the video, e.g., length of time played, amounts wagered, etc.

The ranked 425 videos 245 can then be presented 430 after completion of the electronic game. For example, one or more of the videos may be used to promote the electronic game for which it was recorded. Presenting 430 the stored video stream at a time after completion of the electronic game with the player 120 can comprise presenting 430 the video stream through the display device 220 of the gaming system 105 during an idle period for the gaming system 105. In some cases, the electronic game can be one of a plurality of electronic games available on the gaming system 105. In such cases, presenting 430 the stored video stream at a time after completion of the electronic game with the player 120 can comprise presenting 430 the video stream through the display device 220 during a game selection process. Additionally, or alternatively, presenting 430 the stored video stream at a time after completion of the electronic game with the player 120 comprises presenting 430 the video stream through the display device during a subsequent electronic game with a different player, e.g., in reaction to an event occurring in the electronic game with that player.

Figure 5:
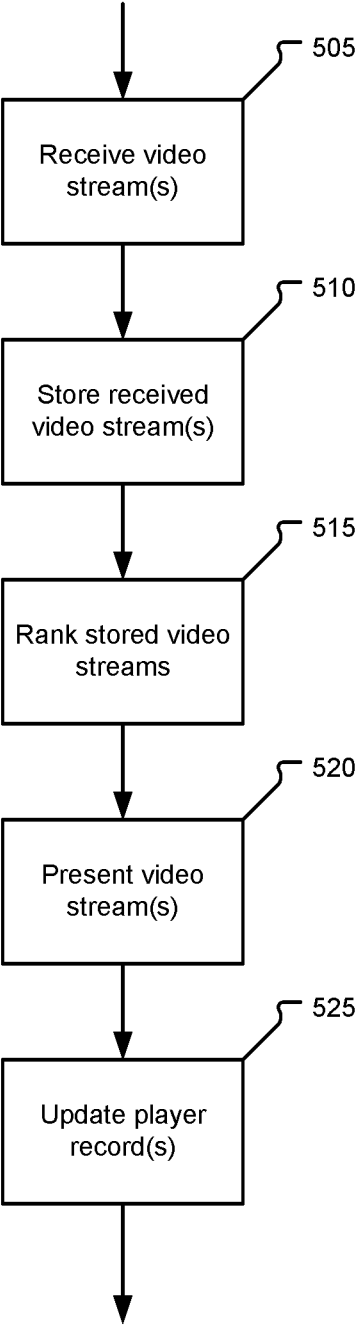
FIG. 5 is a flow diagram illustrating an exemplary process for capturing and ranking videos of players reacting to events in the electronic game and using those videos to attract other players according to another embodiment of the present disclosure.

FIG. 5 is a flow diagram illustrating an exemplary process for capturing and ranking videos of players reacting to events in the electronic game and using those videos to attract other players according to another embodiment of the present disclosure. More specifically, this example illustrates an embodiment as may be performed on a host system 105 as described above. As illustrated in this example, the process can begin with receiving 505 a plurality of video streams. Each video stream of the plurality of video streams 345 can depict a player 120 of an electronic game performing an action after occurrence of an event in the electronic game.

Each video stream 345 can be stored 510 and ranked 515. Ranking 515 the stored plurality of video streams 345 can be based on feedback from viewers of the stored plurality of video streams 345. Additionally, or alternatively, ranking 515 the stored plurality of video streams 345 can performed automatically by the gaming venue host system 105. For example, ranking 515 the stored plurality of video streams 345 can be based on recency of each video stream of the plurality of video streams 345. In another example, ranking 515 the stored plurality of video streams 345 is based on a win amount for the event. In another example, ranking 515 the stored plurality of video streams 345 can be based on a number of players playing an electronic game associated with the video stream after the video stream is presented. Additionally, or alternatively, ranking 515 the stored plurality of videos 345 can be based on game play information for an electronic game associated with the video.

One or more of the stored 510 and ranked 515 video streams 345 can then be presented 520, e.g., by streaming to a gaming system 105, kiosk 140, display device, or other system to be displayed thereon. Presenting 520 the stored video stream a can comprise presenting the video stream through a display device 220 of a gaming system 105 during an idle period for the gaming system 105. In some cases, the electronic game can be one of a plurality of electronic games available on the gaming system 105. In such cases, presenting 520 the stored video stream at a time after completion of the electronic game with the player 120 can comprise presenting 530 the video stream through the display device 220 of the gaming system 105 during a game selection process. Additionally, or alternatively, presenting 520 the stored video stream at a time after completion of the electronic game with the player 120 can comprise presenting the video stream through the display device 220 of the gaming system 105 during a subsequent electronic game with a different player.

An electronic record 350 associated with the player 120 depicted in at least one of the presented 520 video streams can be updated 525 to indicate an award to the player 120 based on the ranking of the stored plurality of video streams 345. For example, the award to the player 120 depicted in the at least one of the presented video streams 345 can comprise any one or more of a credit of a monetary award, a credit of loyalty points, a membership status, services of a gaming venue, access to one or more restricted features of an electronic game, etc.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764, 566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming system comprising:
a display device;
a processor coupled with the display device; and
a memory coupled with and readable by the processor and storing therein a set of instructions which, when executed by the processor, causes the processor to:
conduct an electronic game with a player;
detect an occurrence of a predefined gaming event in the electronic game;
in response to detecting the occurrence of the predefined event in the electronic game, receive a video stream depicting a player of the electronic game;
store the received video stream with a plurality of stored video streams;
rank the plurality of stored video streams based on feedback from viewers of the plurality of stored video streams; and
present one of the plurality of stored video streams through the display device at a time after completion of the electronic game with the player and based on the ranking of the plurality of stored video streams.

2. The gaming system of claim 1, wherein the gaming system further comprises a video camera and wherein receiving the video stream comprises receiving the video stream from the video camera of the gaming system.

3. The gaming system of claim 1, wherein the gaming system further comprises a wireless communications interface and wherein receiving the video stream comprises receiving the video stream from a mobile device of the player of the electronic game through the wireless communications interface.

4. The gaming system of claim 3, wherein the video stream is received at a time after the completion of the electronic game.

5. The gaming system of claim 1, wherein presenting the one of the stored plurality of video streams at a time after completion of the electronic game with the player comprises presenting the one of the stored plurality of video streams through the display device during an idle period for the gaming system.

6. The gaming system of claim 1, wherein the electronic game is one of a plurality of electronic games available on the gaming system, and wherein presenting the one of the stored plurality of video streams at a time after completion of the electronic game with the player comprises presenting the one of the stored plurality of video streams through the display device during a game selection process.

7. The gaming system of claim 1, wherein presenting the one of the stored plurality of video streams at a time after completion of the electronic game with the player comprises presenting the one of the stored plurality of video streams through the display device during a subsequent electronic game with a different player.

8. The gaming system of claim 1, wherein the feedback from the viewers of the plurality of stored video streams comprises liking, voting, or sharing of the plurality of stored video streams.

9. The gaming system of claim 1, wherein ranking the plurality of stored video streams is based on a number of players playing an electronic game associated with the presented one of the plurality of stored video streams after the presented one of the plurality of stored video streams is presented.

10. The gaming system of claim 1, wherein ranking the plurality of stored video streams is based on recency of each video stream of the plurality of stored video streams.

* * * * *